No. 634,148. Patented Oct. 3, 1899.
G. B. SELLERS.
GRAIN THRESHING AND SEPARATING MACHINE.
(Application filed July 1, 1898.)
(No Model.)
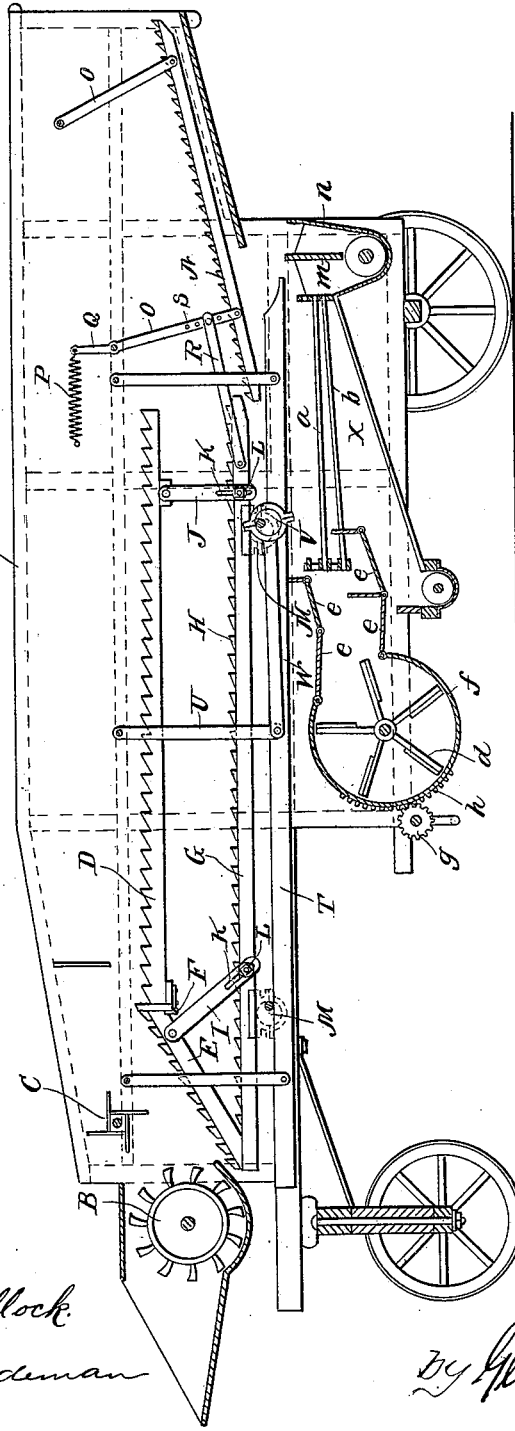
Witnesses:
H. B. Hallock.
E. C. Windeman
Inventor.
George B. Sellers,
By Geo. C. Hazelton Jr.
Attorney.
THE NORRIS PETERS CO., PHOTO-LITHO., WASHINGTON, D. C.

UNITED STATES PATENT OFFICE.

GEORGE B. SELLERS, OF MARSHALLTOWN, IOWA.

GRAIN THRESHING AND SEPARATING MACHINE.

SPECIFICATION forming part of Letters Patent No. 634,148, dated October 3, 1899.

Application filed July 1, 1898. Serial No. 684,925. (No model.)

*To all whom it may concern:*

Be it known that I, GEORGE B. SELLERS, a citizen of the United States, residing at Marshalltown, county of Marshall, and State of Iowa, have invented a certain new and useful Improvement in Grain Threshing and Separating Machines, of which the following is a specification.

My invention relates to a new and useful improvement in grain threshing and separating machines, and has for its object primarily to improve upon the construction and operation of the machine shown and described in my application for United States Letters Patent, Serial No. 657,826, allowed April 6, 1898.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 shows a threshing-machine in longitudinal section, illustrating the mechanism thereof. Fig. 2 is a longitudinal vertical section of the grain-pan.

In carrying out my invention as here embodied, A represents the frame of the machine, having arranged therein the cylinder B for the feeding of the straw, as is well understood, and C represents the beater, arranged in the rear of the cylinder.

D is the upper straw-rack, which is composed of what I term "fish-back" ribs, and these may be of any desired number arranged parallel, and they are hinged to the inclined slatted platform E, as indicated at F.

G represents the lower straw-rack, which is composed of a series of slats H, arranged in close proximity to each other, and the upper rack is supported upon this lower rack by means of the adjustable bars I and J. The lower ends of each of these bars are slotted, as indicated at K, through which the bolt L passes, by which means the upper rack is made adjustable, so as to vary its height relative to the lower rack, and this is of considerable advantage, accommodating the machine for various classes of work, since by reason of the degree of inclination of the bar-slatted platform E the grain and chaff will be retarded or permitted a more rapid movement. The lower rack is in turn supported upon the eccentrics M, (shown in dotted lines,) so that when the machine is in operation both the racks are given a longitudinal and vertical reciprocating motion, which effects the desired results.

The tail-rack N is hung upon four links O, two of which are here shown in the drawings, and a coil-spring P is attached to an extension Q of one or more of these links, so as to counterbalance the tendency of this rack to swing downward and forward. A rod R connects one or more of the links O to the lower rack, and a series of holes S is provided for the adjustment of the outer end of this rod, so as to increase or decrease the throw imparted from the rack G to the tail-rack, as will be readily understood. The grain-pan T is hung upon these links U, three of which are shown in the drawings, and the eccentric V transmits an oscillatory movement thereto through the eccentric-rod W, and I prefer that this eccentric V shall be arranged diametrically opposite the eccentricity of the eccentrics M, so as to bring about a balance of movement and action. The grain-pan may be provided with a float T' in the shape of a grating, the object of which is to permit the grain to pass therethrough, but the larger particles of chaff or straw which may have fallen into the grain-pan to be carried forth.

X represents the shoe, in which are arranged the chaffer $a$ and the riddle $b$, through which the grain must pass and is there subjected to the action of the draft from the fan $d$. The throat of this fan is composed of hinged sections $e$, which are so arranged as to permit the contraction or expansion of this throat by a limited rotation of the fan-casing $f$. This casing may be thus revolved by means of a pin $g$, which meshes with a segmental gear $h$, formed upon the casing, as will be readily understood.

A tail-board $m$ and a second tail-board $n$ are provided in order that when the grain is driven by draft the lighter portion thereof which might pass over the tail-board $m$ is caught by the tail-board n and precipitated within the trough.

Any suitable mechanism may be used for the operation of the pinion, such as a crank, and it is to be noted that the fan may be used either as an under or over blast by either using the belt open or crossed, and this, in connection with the adjustability of the throat, greatly facilitates the operation of the machine under various conditions.

Of course I do not wish to be limited to the exact details of construction here shown, as these may be varied to a certain extent without departing from the spirit of my invention.

Having thus fully described my invention, what I claim as new and useful is—

1. In combination with a machine of the character described a separating-rack consisting of a series of fish-back ribs, an inclined slatted platform hinged to one end of said rack, a slatted rack mounted upon eccentrics and having posts adjustably attached thereto, one set of said posts lying diagonally and pivoted to the inclined slatted rack and the other set being arranged vertically, substantially as described.

2. In a separating-machine of the character described, a slatted rack, eccentrics upon which said rack is mounted, an inclined slatted platform supported by the rack, an upper rack consisting of a series of fish-backs hinged to the platform, slotted posts so arranged as to adjustably support the upper rack upon the lower rack, a tail-rack, links for suspending said tail-rack, springs for counterbalancing the action of the latter, means for adjustably connecting the tail-rack with the first-named rack, a grain-pan arranged beneath the racks, links for suspending said pan, an eccentric, an eccentric-rod for transmitting motion from said eccentric to the grain-pan, a shoe adapted to receive the grain, a fan, and a casing for inclosing said fan, the throat of which is adjustable, as specified.

3. In combination with a separating-machine of the character described, a fan, a casing for inclosing the same, a throat composed of hinged sections leading from the casing, a segmental gear formed upon the casing, and a pinion meshing with this gear for revolving the casing to adjust the throat, as specified.

In testimony whereof I have hereunto affixed my signature in the presence of two subscribing witnesses.

GEORGE B. SELLERS.

Witnesses:
J. ROY ROBERTS,
T. A. SIEG.